United States Patent [19]

Nakao et al.

[11] Patent Number: 4,845,607
[45] Date of Patent: Jul. 4, 1989

[54] DUAL INPUT VOLTAGE POWER SOURCE FOR SELECTIVELY SWITCHING BETWEEN VOLTAGE DOUBLER RECTIFICATION AND FULL-WAVE RECTIFICATION FUNCTIONS

[75] Inventors: Fumiaki Nakao, Maisaka; Noboru Kato, Arai, both of Japan

[73] Assignee: Fuji Electrochemical Co., Ltd., Tokyo, Japan

[21] Appl. No.: 173,423

[22] Filed: Mar. 25, 1988

[30] Foreign Application Priority Data

Mar. 27, 1987 [JP] Japan .................................. 62-71854

[51] Int. Cl.$^4$ ............................................ H02M 7/10
[52] U.S. Cl. ........................................ 363/49; 363/61; 363/143
[58] Field of Search ................ 363/49, 61, 81, 88, 363/142, 143; 323/299, 300

[56] References Cited

U.S. PATENT DOCUMENTS

| | | | |
|---|---|---|---|
| 3,846,692 | 11/1974 | Hill | 328/150 |
| 3,852,731 | 12/1974 | Hollands | 328/111 |
| 4,540,892 | 9/1985 | Carvalho | 363/142 |
| 4,665,323 | 5/1987 | Russell et al. | 363/143 |
| 4,780,805 | 10/1988 | Chewuk et al. | 363/142 |
| 4,783,729 | 11/1988 | Konopka | 363/143 |
| 4,805,083 | 2/1989 | Konopka | 363/143 |

FOREIGN PATENT DOCUMENTS

| | | | |
|---|---|---|---|
| 3344105 | 6/1985 | Fed. Rep. of Germany | 363/143 |
| 46675 | 3/1982 | Japan | 363/143 |
| 60-27916 | 2/1985 | Japan | |

OTHER PUBLICATIONS

"110 VAC/200 VAC Detector Switch," IBM Tech. Discl. Bul., vol. 27, No. 10B, pp. 6214, 6215, Mar. 1985.
"Automatic Input-Selecting Power Supply," IBM Tech. Discl. Bul., vol. 28, No. 3, pp. 1246, 1247, Aug. 1985.

Primary Examiner—William H. Beha, Jr.
Attorney, Agent, or Firm—Barnes & Thornburg

[57] ABSTRACT

In an automatic voltage switching power source having a full-wave rectifier circuit and a voltage doubler circuit, a controller comprises a plurality of voltage level detectors which are associated with an input ac voltage and detect different voltages, and a switching signal generator which generates a delayed signal for switching between the full-wave rectifier and voltage doubler circuits based on the logical product of the outputs of the voltage level detectors, thereby preventing the electric circuit of the power source and the electric device to be supplied with the power from being damaged by excessively high voltages.

8 Claims, 4 Drawing Sheets

DUAL INPUT VOLTAGE POWER SOURCE FOR SELECTIVELY SWITCHING BETWEEN VOLTAGE DOUBLER RECTIFICATION AND FULL-WAVE RECTIFICATION FUNCTIONS

BACKGROUND OF THE INVENTION

1. Field of the Invention

The present invention relates generally to an automatic voltage switching power source and more specifically to a power source apparatus capable of supplying a constant output with different input ac voltages by automatically switching between voltage doubler rectification and full-wave rectification.

2. Description of the Background Art

Generally, two types of so-called commercial ac power sources, namely the 100V system utilized in U.S.A. and Japan and the 200V system utilized in Europe and others, are available. In order to allow the same electric device or the like to be operated by either of the commercial power source systems, a switching power source or the like is demanded which can always generate a constant output dc voltage even if different ac voltages are supplied. Usually, the switching power source or the like incorporated in the device is designed for the 200V system and performs full-wave rectification as the ordinary operation if the power source is operated by the 200V system but performs voltage doubler rectification to double the output if the power source is operated by the 100V system. The switching between the ordinary and doubler rectifications is typically carried out manually with a mechanical switch.

However, not only the switching operation is troublesome but also a problem of destructing the succeeding electric device and the power source circuit itself arises if the switching operation is incorrectly performed, particularly if the voltage doubler rectification is carried out with 200V to supply a doubled output voltage system instead of the full-wave rectification. Also, if the switching is reversely operated with 100V system, only a half of the normal output voltage is generated, causing a problem of insufficient power which disables the electric device or the like from being driven normally.

Figure 1:
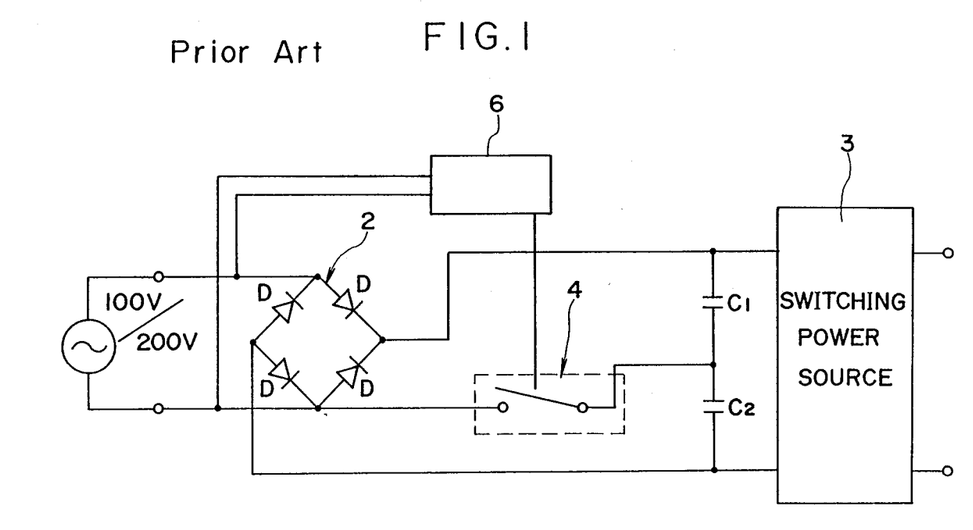
FIG. 1 is a circuit diagram showing a conventional power source apparatus.

Consequently, an automatic switching power source capable of automatically switching the rectification functions through detecting whether the supplied ac voltage is high or low, has been proposed that has structures as shown in FIG. 1. In FIG. 1, first and second capacitors C1 and C2 are connected in series between the output terminals of a bridge rectifying circuit 2 composed of four diodes D, and the output terminals of the bridge rectifying circuit 2 is connected to a switching power source 3. The connection point of the first and the second capacitors C1 and C2 is connected to the input ground terminal of the bridge rectifying circuit 2 through a switch means 4.

The switch means 4 is associated with a control circuit 6 which is connected between the input terminals of the bridge rectifying circuit 2, and is so designed as to open if the voltage between the input terminals is high and to close if the voltage is low. That is, if the voltage is high, the switch means opens and the ordinary full-wave rectification is performed. If the voltage is low, the switch means closes and the first and the second capacitors C1 and C2 are individually connected to the output of the bridge rectifying circuit 2, so that the voltage between the terminals of the capacitors C1 and C2 is made to be two times as large as the voltage provided by the full-wave rectification.

However, since the switch is simply closed when the input voltage is lower than 100V (effective value) and opened when the voltage is higher than 100V (effective value) in the known apparatus described above, various problems are caused. Namely, assuming that the apparatus is just connected to the 200V system, the voltage applied to the apparatus does not become 200V at the moment it is connected to the commercial power source but reaches 200V after a given transient period has passed. In the earlier region of the transient period, the voltage doubler rectification is carried out with the switch closed since the voltage to the apparatus is lower than 100V. Even if the voltage increases further and exceeds 100V, the switch cannot alters instantly and therefore the voltage doubler rectification continues for a certain period of time after exceeding 100V. As a result, the electric device or the like may be damaged.

A problem similar to the one described above is also caused while the apparatus is being driven by the 200V system, if an instantaneous drop, or voltage decrease for a certain period of time, takes place to decrease the voltage from the commercial power source once to a level lower than 100V and then the voltage returns to the normal level.

SUMMARY OF THE INVENTION

The present invention has been established in view of the aforementioned problems, and an object thereof is to provide an automatic voltage switching power source which can surely prevent the electric circuit and the electric device connected in the following stage from being damaged, and which can output a constant voltage and switch to optimal rectifier means automatically.

According to the present invention, an automatic voltage switching power source includes a rectifying circuit having both of voltage doubler rectification and full-wave rectification functions, a switch means for switching between the voltage doubler rectification and the full-wave rectification functions of the rectifying circuit, and a control means for controlling the switch means in accordance with a value of an input ac voltage to the rectifying circuit. The control means comprises a plurality of voltage level detector means associated with the input ac voltage and adapted to detect different voltages, and a switching signal generator means which generates a delayed signal for switching the switch means based on the logical product of the outputs of the plurality of voltage level detector means.

The voltage value of the input voltage is detected by way of the plurality of voltage level detector means, and in order to perform the rectification based on the detection the signal is generated from the switching signal generator means, switching the switch means to be in the optimal condition.

When a voltage value variation or fluctuation happens in a static state, the switching signal is generated from the switching signal generator means with a delay in such a manner that the rectifier means is not switched if the variation is instantaneous and does not affect the apparatus or the like, and that the rectifier means is switched based on the generated signal if the period of the variation is long to the extent that the apparatus or the like may be damaged.

In this way, the switching to the optimal rectifying means can be performed based on the difference of the input voltages.

The present invention will be understood more fully from the detailed description given herebelow and from the accompanying drawings of preferred embodiments of the invention, which however, should not be taken to limit the invention to the specific embodiments but are for explanation and understanding only.

DESCRIPTION OF THE PREFERRED EMBODIMENTS

Referring to the drawings, a preferred embodiment of the present invention is now described.

Figure 2:
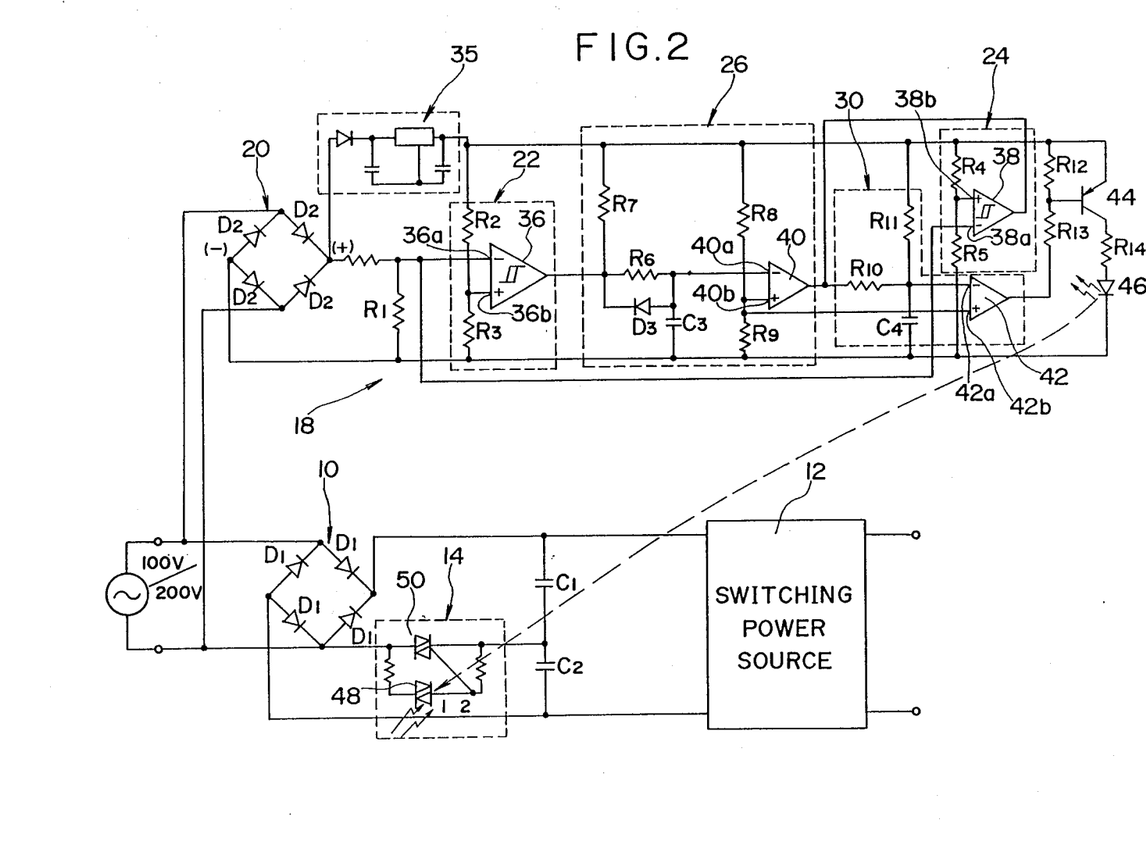
FIG. 2 is a circuit diagram showing a preferred embodiment of an automatic voltage switching power source according to the present invention.

As shown in FIG. 2, the output terminals of a commercial power source supplying an ac voltage of 100V or 200V are connected to the input terminals of a first bridge rectifying circuit 10 composed of four diodes D1. Two capacitors C1 and C2 are connected in series between the output terminals of the first bridge rectifying circuit 10, and the output terminals of the bridge rectifying circuit are connected to a switching power source 12. A switch circuit 14 is interposed between the connecting point of the first and the second capacitors C1 and C2 and the minus input terminal of the first bridge rectifying circuit 10. A control circuit 18 is connected between the input terminals of the first bridge rectifying circuit 10, and the aforementioned switch circuit 14 is opened and closed in accordance with the output signals of the control circuit 18. The constitution described above is similar to that of th conventional apparatus.

In accordance with the present invention, the aforementioned control circuit 18 is constituted as follows. The input terminals of a second bridge rectifying circuit 20, which comprises four diodes D2 for full-wave-rectifying the input voltage, are connected to the power source in parallel with the first rectifying circuit 10, and a first voltage level detecting circuit 22 and a second voltage level detecting circuit 24 are parallelly connected between the output terminals of the second bridge rectifying circuit 20 through a resistor R1. The output of the first voltage level detecting circuit 22 is connected to the input terminal of a delay circuit 30 through a voltage judging circuit 26, and the output signal of the second voltage level detecting circuit 24 is also input to the delay circuit 30. The delay circuit is adapted to obtain a logical product of the outputs of the second voltage level detecting circuit 24 and the voltage judging circuit 26 and to output a low level with a delay if both levels of the outputs are high. The switching means 14 is adapted to close for carrying out the voltage doubler rectification if the output of the delay circuit becomes low level.

Furthermore, the output terminals of the second bridge rectifying circuit 20 are connected to a constant voltage generating circuit 35 comprising two capacitors and a 3-terminal regulator.

The respective circuits are described in detail. The first voltage level detecting circuit 22, which detects that the input voltage becomes lower (higher) than a predetermined value, is composed of a first comparator 36 with hysteresis. One of the terminals (+) of the aforementioned second bridge rectifying circuit 20 is connected to the inverting input terminal 36a of the first comparator 36, while the non-inverting input terminal 36b is connected to the connecting point of second and third resistors R2 and R3 that are connected between the output terminal of the constant voltage generating circuit 35 and the other terminal (−) of the bridge rectifying circuit 20. Namely, a first reference voltage E1 which is provided by dividing the voltage supplied from the constant voltage generating circuit 35 with the second and the third resistors R2 and R3 is input to the non-inverting input terminal 36b of the first comparator 36, and the instantaneous value of the full-wave-rectified voltage input to the inverting input terminal 36a is compared with the first reference voltage E1 to generate a pulse from the output of the first comparator 36 when the instantaneous voltage becomes higher than the other (a pulse is here said to be generated when the output becomes low level with the high level as being reference). The first comparator 36 of this embodiment has hysteresis. Therefore, once a voltage higher than the first reference voltage E1 is input and the output of the first comparator 36 changes from the high to the low level, the output does not immediately return to the high level after the input voltage becomes lower than the first reference voltage E1; until the input voltage decreases to a second reference voltage E2 (E2 < E1), the output maintains the low level and then turns to the high level. In other words, even if the input voltage reaches the first reference voltage E1 instantaneously and then drops immediately, a pulse with a certain width is output.

The constitution of the second voltage level detecting circuit 24 is the same as that of the first voltage level detecting circuit 22, however, with a different set value for detection. Namely, the full-wave rectified voltage is input to the inverting input terminal 38a of a second comparator 38 and a third reference voltage E3 generated by the voltage division with fourth and fifth resistors R4 and R5 is input to the non-inverting input terminal 38a for comparison. In this second voltage level detecting circuit 24, the reference voltage E3 is different from the first one E1, by setting the ratio of the fourth and the fifth resistors R4 and R5 differently from that of the second and the third resistors R2 and R3. Specifically, the first reference voltage E1 and the third reference voltage E3 are set to 60V and 140V respectively.

The voltage judging circuit 26 operates based on the output of the first voltage level detecting circuit 22 and is adapted to output a pulse (with a high level as reference) when a crest value of the input voltage to the first voltage level detecting circuit 22 is lower than the first reference voltage E1. The circuit 26 is constituted in such a manner that the output of the first comparator 36 is connected to the inverting input terminal 40a of a third comparator 40 through a sixth resistor R6, and the inverting input terminal 40a is also connected to the ground through a third capacitor C3. A diode D3 is parallelly connected between the terminals of the sixth resistor R6 so that a current flows from the third comparator 40 to the first comparator 36. One of the terminals of a seventh resistor R7 having a sufficiently smaller resistance than that of the sixth resistor R6 is connected to the resistor R6's terminal for the first comparator 36, and the other terminal of the seventh resistor R7 is connected to the output terminal of the constant voltage generating circuit 35. Thus, the voltage generated by the constant voltage generating circuit 35 is input to the third capacitor C3, and to the inverting input terminal 40a of the third comparator 40, through the seventh and the sixth resistors R7 and R6 connected in series to the constant voltage generating circuit 35. On the other hand, the connection point of eighth and ninth resistors R8 and R9, which are connected in series between the output terminal of the constant voltage generating circuit 35 and the ground, is connected to the non-inverting input terminal 40b of the third comparator 40, whereby a fourth reference voltage E4 determined by a voltage dividedly generated by means of the resistors is input to the terminal 40b.

In this voltage judging circuit 26, the output terminal of the first comparator 36 and the ground are isolated from each other when the output of the first comparator 36 is at the high level, so that the third capacitor C3 is charged by means of the constant voltage generating circuit 35, and the terminal voltage of this third capacitor C3 is input to the inverting input terminal 40a of the third comparator 40. So far as the input voltage is normal (higher than 60V), the output of the first comparator 36 changes from the high level to the low level after a given time has passed, shorting the output terminal of the first comparator 36 to the ground and thereby discharging the charge stored in the third capacitor almost instantly through the diode D3. Because the alternating cycle (interval) between the high and the low levels is constant, the maximum charge amount for the third capacitor C3 is also constant. Therefore, by setting the fourth reference voltage E4 higher than the terminal voltage of the capacitor C3 with the maximum charge, the output of the third comparator 40 is kept high since the voltage at the non-inverting input terminal 40b is always higher than the voltage at the inverting input terminal 40a when the input voltage is higher than 60V. On the other hand, if the input voltage is lower than 60V, the output of the first comparator 36 keeps the high level so that the third capacitor C3 is continuously charged and its terminal voltage keeps on increasing. At the time the terminal voltage of the third capacitor C3 becomes higher than the fourth reference voltage E4, the output of the third comparator 40 turns from the high to the low level. In this operation, the output of the third comparator 40 does not change at the moment the crest value of the input voltage becomes lower than 60V, due to the time constant of the sixth resistor R6 and the third capacitor C3; the output turns to the low level after a predetermined time has passed. If the input voltage becomes higher than 60V again, a period in which the output of the first comparator 36 is low is provided, so that the charge stored in the third capacitor C3 is discharged in that period and the output of the third comparator 40 returns to be the high level.

The delay circuit 30 includes a fourth comparator 42, a tenth resistor R10 connected between the inverting input terminal 42a of the fourth comparator 42 and the output terminal of the aforementioned third comparator 40. An eleventh resistor R11 and a fourth capacitor C4 are connected in series between the output terminal of the constant voltage generating circuit 35 and the ground, the connection point of the eleventh resistor R11 and the fourth capacitor C4 being connected to the inverting input terminal 42a of the fourth comparator 42. The resistance of the tenth resistor R10 is sufficiently smaller than that of the eleventh resistor R11. Currents flow through the tenth resistor R10 when the charge stored in the fourth capacitor C4 is discharged and through the eleventh resistor R11 when the fourth capacitor C4 is charged. Therefore, when the fourth capacitor C4 is charged, the charging takes a relatively long time due to the time constant determined by the eleventh resistor R11 and the fourth capacitor C4, and when the charge stored in the fourth capacitor C4 is discharged, it is carried out in a relatively short time due to the time constant determined by the tenth resistor R10 and the fourth capacitor C4.

The aforementioned fourth reference voltage E4 is input to the non-inverting input terminal 42b of the fourth comparator 42, and the output of the comparator 42 alters to the low level when the terminal voltage of the fourth capacitor C4 exceeds the fourth reference voltage E4. If this occurs, the output terminal of the fourth comparator 42 and the ground are shorted, applying a base voltage divided by a twelfth resistor R12 and a thirteenth resistor R13 to a transistor 44 connected to the output terminal of the fourth comparator 42. As a result, the transistor 44 is turned ON to supply a current from the constant voltage generating circuit 35 to a photodiode 46 connected to the collector of the transistor 44 via a fourteenth resistor R14, turning on a phototriac 48 through the photoexcitation of the photodiode 46. Therefore, a switch circuit 50 comprising the phototriac 48 and a trias 50 is closed, permitting the voltage doubler rectification to take place. Specifically, when the phototriac 48 is turned on, a turn-on voltage is applied to the gate of the triac 50. This makes the triac 50 conductive, closing the switch.

The aforementioned delay circuit 30, the transistor 44 and the photodiode 46 thus constitutes a switching signal generating means.

The operation of the above circuits is described.

Firstly, an operational principle is as follows. When the power source is turned on, the voltage does not instantly rise to 100V or 200V but gradually increases during the early transient period after the turn-on of the power and then becomes stable at a predetermined voltage value. When the voltage is lower than 100V during the transient period, it cannot be determined whether the commercial power source is the 100V system or the 200V system. In order to protect the electric device or the like, the full-wave rectification is carried out with the input voltage in a range below 60V independent of whether the power source is the 100V system or the 200V system. If the input voltage is stable in a range of 60V to 140V, the power source can be supposed to be the 100V system, so that the voltage doubler rectification is performed. If the input voltage exceeds 140V, the power source must be the 200V system, and thus the full-wave rectification is carried out. Furthermore, in the transient period after the turn-on of the 200V power source, the input voltage becomes 200V after passing through a range of 60V to 140V. Consequently, the full-wave rectification should be performed in the transient range of 60V to 140V of the 200V system. Otherwise, the electric circuit or the like may be destroyed due to high voltages when the input voltage exceeds 140V.

The operation is now more fully described for each condition. Assuming that it is not known the input voltage is from the 100V system or the 200V system, when the power source is turned on and the input voltage gradually rises, both of the outputs of the first and the second comparators 36 and 38 are high during the instantaneous value of the input voltage under 60V. As the output of the third comparator 40 changes to the low level only after a predetermined delay time has passed corresponding to a first time constant t1 which is determined by the sixth resistor R6 and the third capacitor C3, the input for the fourth comparator 42 is the high level during a period immediately succeeding the turn-on of the power source. During such a period, however, the fourth capacitor C4 is not sufficiently charged due to a relatively long second time constant t2 determined by the eleventh resistor R11 and the fourth capacitor C4. The fourth reference voltage E4 is therefore higher than the terminal voltage of the capacitor C4, resulting in the high level output of the comparator 42 and in the turn-off of the transistor 44. After a time corresponding to the first time constant t1 has passed and after the output of the third comparator 40 has turned to the low level, the charge stored in the fourth capacitor C4 is discharged through the tenth resistor R10 to let the terminal voltage of the capacitor C4 zero. Thus, the output of the fourth comparator 42 maintains the high level and the switch circuit 14 is opened, allowing the full-wave rectification to be performed.

Next, if the input voltage rises to a range of 60V to 140V. only the output of the first comparator 36 changes from the high to the low level and thereafter a sequence of pulses are continuously generated. As a result, the output of the third comparator 40 keeps the high level as described above. Also, the output of the second comparator 38 is high since the input voltage does not reach the third reference voltage E3. Therefore, both of the outputs are high and the tenth resistor 10 is opened, permitting the fourth capacitor C4 to be charged. Since this condition is maintained if the input voltage is supplied from the 100V system, the terminal voltage of the fourth capacitor C4 exceeds the fourth reference voltage E4 after a time corresponding to the second time constant t2 has passed, so that the output of the fourth comparator 42 changes to the low level and the transistor 44 is turned on. Accordingly, the switch circuit 14 is closed as described above to carry out the voltage doubler rectification.

However, in the case of the 200V system, the input voltage further increases and its instantaneous value exceeds the third reference voltage E3, resulting in the low level output of the second comparator 38 followed by a sequence of pulses with a predetermined cycle. This change of the output of the second comparator 38 to the low level allows the charge stored in the fourth capacitor C4 to be discharged and thus the output of the fourth comparator 42 becomes high. Therefore, the switch circuit 14 is opened, permitting the full-wave rectification to be performed. The aforementioned second time constant t2 is set sufficiently large in order that the instantaneous value of the input voltage exceeds 140V and the output of the second comparator 38 turns to the low level before the fourth capacitor C4 is charged enough to change the output of the fourth comparator 42. This permits the full-wave rectification to be carried out even in the transient period with a voltage range of 60V to 140V following the turn-on of the 200V power source.

In this way, the switching to the predetermined rectification is automatically performed with safety and accuracy even if it is not known whether the input voltage is supplied by the 100V system or the 200V system.

Figure 3:
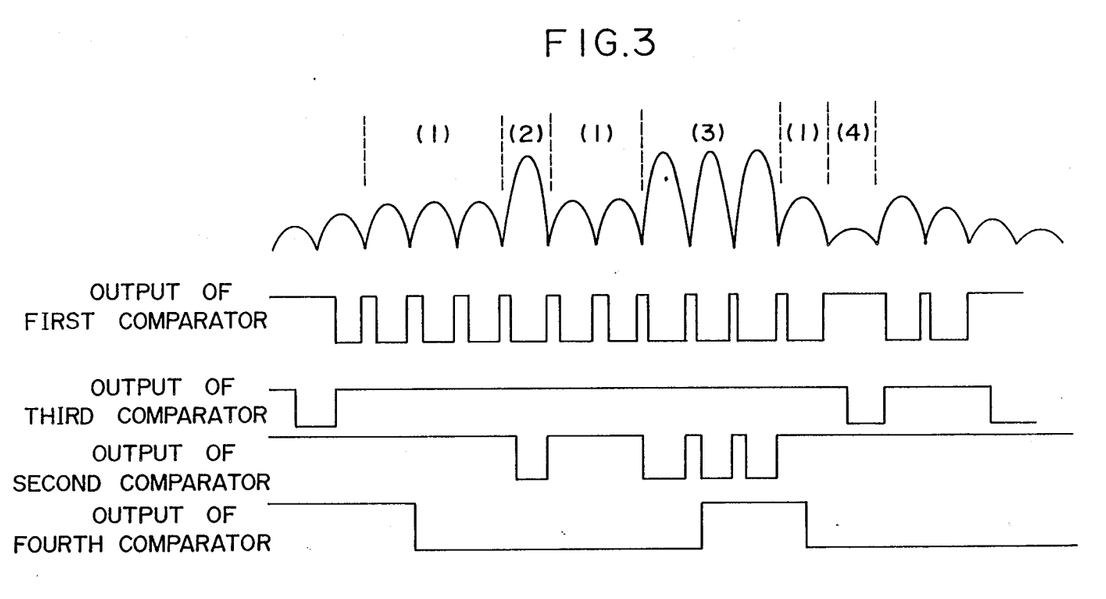
FIGS. 3 and 4 are timing charts for use in explanation of operations of the apparatus in FIG. 2.

It is now assumed that the input voltage from the 100V system has reached a predetermined value and becomes stable there. As shown in FIG. 3, the voltage doubler rectification is carried out in the normal region (1). In regions (2) and (3) where the input voltage instantaneously rises over 140V due to noises or the like, there is no change in the output of the first comparator 36 since the input of the first comparator 36 is larger than the first reference voltage E1 (60V) but the second comparator 38 generates a pulse, that is, its output turns to the low level. Then the charge stored in the fourth capacitor C4 is discharged through the tenth resistor R10 in accordance with a time constant t3 determined by the tenth resistor R10 and the fourth capacitor C4. The discharge is continued and the terminal voltage of the fourth capacitor C4 becomes lower than the fourth reference voltage E4, where the output of the fourth comparator 42 changes to the high level and thus the full-wave rectification is performed. If the input voltage returns to the normal condition before the fourth capacitor C4 discharges to the above extent, the fourth capacitor C4 is charged again to maintain the voltage doubler rectification instead of the full-wave rectification. It is to be noted in this connection that the third time constant t3 is set in the following manner: the operation is not switched to the full-wave rectification if the time period of the high voltage region is so short (e.g. region (2)) that the first and the second capacitors C1 and C2 and others connected to the switching power source 12 are not charged to the extent of being damaged; but it is switched to the full-wave rectification if the high voltage region continues longer (e.g. region (3)). By this, the electric apparatus, the circuit, and so forth are prevented from being damaged while performing the optimal rectification operation. In further detail, if the operation would be switched to the full-wave rectification immediately when the voltage value becomes high, the connected electric apparatus or the like would not operate normally in case of the instantaneous voltage increase where the input voltage quickly returns to 100V. On the other hand, if the voltage doubler rectification would be performed in case of the continuous high voltage for a long time. The electric circuit or the like would be damaged due to the high voltage (two times the normal voltage) applied thereto. In order to solve these problems, the circuit is constituted and acts in the manner described above.

Furthermore, in case the instantaneous drop (i.e. the instantaneous decrease of the crest value) or the power supply interruption is caused as in region (4), both of the outputs of the first and the second comparators 36 and 38 are high similarly to the condition where the power has been just turned on. However, the output of the third comparator 40 does not change to the low level until a predetermining period of time corresponding to the first time constant t1 has elapsed, maintaining the voltage doubler rectification for that period. The input voltage recovers the normal value in a relatively short time and the electric device or the like can continuously perform its normal operation.

Figure 4:
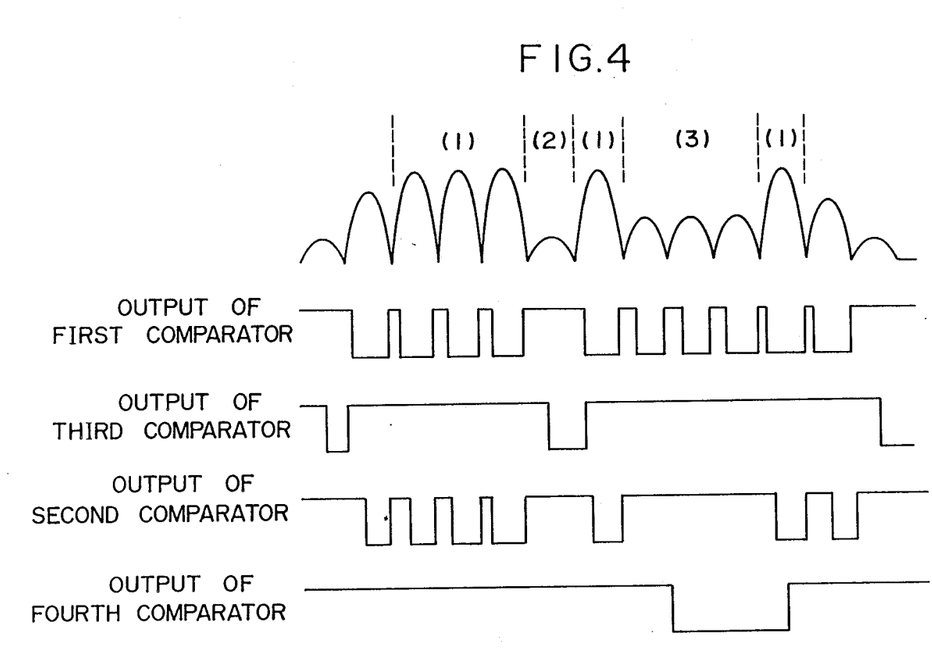

Next, it is assumed that the voltage supplied by the 200V system has reached a predetermined value. As shown in FIG. 4, in the normal region (1) the output of the second comparator 38 sends out a sequence of pulses (repeating the switching between the low and the high levels) while the output of the third comparator 40 maintains the high level. Therefore the tenth resistor R10 is opened and shorted alternately, and the fourth capacitor C4 is not sufficiently charged due to the second time constant t2. As a result, the output of the fourth comparator 42 keeps the high level, allowing the full-wave rectification to be carried out. Then, when the instantaneous voltage drop (under 60V) due to a noise or the like or the instantaneous power supply interruption takes place (region (2)), there will be no severe problem since the full-wave rectification is being performed. If the instantaneous drop is in a range of 60V to 140V, the fourth capacitor C4 begins to be charged but the change of the output of the fourth comparator 42 is delayed for a predetermined time according to the second time constant t2 with maintaining the full-wave rectification during that period. If the voltage recovers the normality within that period, the full-wave rectification is continued.

In the region (3) where the instantaneous drop in a range of 60V to 140V continues for a relatively long time, the charge stored in the capacitor C4 is discharged in the period corresponding to the third time constant t3 through the tenth resistor R10 and the terminal voltage of the capacitor C4 becomes lower than the fourth reference voltage E4. Thus the output of the fourth comparator 42 turns to the low level, switching the operation to the voltage doubler rectification.

If the operation would be switched to the voltage doubler rectification immediately after the voltage has instantaneously dropped due to a noise or the like, the electric circuit might be damaged since the voltage becomes excessively high when recovering the normality. Therefore, the full-wave rectification should be maintained in such case. On the other hand, if the instantaneous drop status continues by any reason, the electric apparatus or the like in the following stage should be prevented from operating abnormally due to the low output voltage provided by the full-wave rectification. Both of the problems can be solved as described above.

In the case where the power source has been turned off, the output gradually decreases, passing the range of 60V to 140V for the voltage doubler rectification. However, the switching to the voltage doubler rectification is also delayed by a predetermined time due to the second time constant t2. In an ordinary turn-off operation, the input voltage further decreases to the region below 60V for the full-wave rectification before the rectifying means is switched to the doubler one. As a result, the full-wave rectification continues throughout the power source turned off operation. To perform the voltage doubler rectification below 140V is not a problem itself. However, if the switch is turned on to supply the power again just after the voltage drop, the electric apparatus, the circuit, and so forth might be damaged by the voltage doubler rectification of the voltage of 200V. This trouble is prevented by the action described above.

As set forth above, in accordance with the present invention the electric circuit and the electric apparatus connected in the succeeding stage is surely prevented from being damaged, and a constant voltage can be provided. Furthermore, the apparatus enables to automatically switch to the optimal rectifying means for different voltages.

It should be understood that another power source independent of the input voltage can apparently be employed instead of the above constant voltage generating circuit utilizing the input voltage. Also, the switch circuit is not limited to the one formed by the triac, and various types of switch circuits may be employed.

Also, other circuits which are constituted differently but act in the same way as set forth above can be utilized and thus the circuit should not be limited to the particular structure described above.

Further, the input voltages are not restricted to 100V and 200V, and the automatic switching for various input voltages can be carried out by changing the multiplication factor of the voltage doubler rectification.

What is claimed is:

1. A dual input voltage power source for selectively switching between voltage doubler rectification and full-wave rectification functions comprising a rectifying circuit having both of a voltage doubler rectification means and a full-wave rectification means, a switch means for switching between the voltage doubler rectification means and the full-wave rectification means of said rectifying circuit, and a control means for controlling said switch means in accordance with a value of an input ac voltage to said rectifying circuit, wherein said control means comprises:

a plurality of voltage level detector means for detecting different voltages of said input ac voltage and including at least first and second voltage level detector means, each said voltage level detector means having a comparing and pulse generating means for comparing the voltage provided by rectifying said input ac voltage with a reference voltage and for generating an output pulse when the instantaneous value of said voltage is higher than said reference voltage, and each of said comparing and pulse generating means of said first and second voltage level detector means including first and second comparators, each of said first and second comparators having hysteresis for providing effective output pulses each having a predetermined width; and a switching signal generator means for generating a delayed signal for switching said switch means based on the simultaneous occurrence of specific states at the outputs of said plurality of voltage level detector means.

2. A voltage power source as claimed in claim 1, wherein said reference voltages for said plurality of voltage level detector means are supplied by dividing the output of a single constant voltage generating means.

3. A voltage power source as claimed in claim 2, wherein said constant voltage generating means comprises a constant voltage generating circuit which outputs a constant voltage with an input voltage provided by rectifying said input ac voltage.

4. A voltage power source as claimed in claim 1, wherein said first voltage level detector means further includes a third comparator adapted to generate a pulse when said first comparator does not generate a pulse for a predetermined period of time.

5. A voltage power source as claimed in claim 4, wherein said switching signal generator means includes a capacitor adapted to be selectively charged by the outputs of said third comparator of said first voltage level detector means and said second comparator of said second voltage level detector means, and a fourth comparator for comparing the terminal voltage of said capacitor with a reference voltage and generating a pulse when said terminal voltage becomes higher than said reference voltage.

6. A voltage power source as claimed in claim 5, wherein said switching signal generator means further includes a transistor adapted to turn on or off correspondingly to the output of said fourth comparator, and a photodiode connected to said transistor and supplied with a current when said transistor is turned on.

7. A voltage power source as claimed in claim 6, wherein said current for said photodiode is supplied from said constant voltage generating circuit through said transistor.

8. A automatic voltage switching power source as claimed in claim 7, wherein said switch means comprises a triac and a phototriac connected in parallel, said phototriac turning on by the photoexcitation of said photodiode, and said triac becoming conductive when a turn-on voltage is applied to the gate thereof by the turn-on of said phototriac, thereby closing the switch.

* * * * *